United States Patent
Alm et al.

(10) Patent No.: US 9,399,937 B2
(45) Date of Patent: Jul. 26, 2016

(54) OPERATING METHOD FOR AN EXHAUST AFTERTREATMENT SYSTEM AND EXHAUST AFTERTREATMENT SYSTEM

(75) Inventors: Christer Alm, Göteborg (SE); Andreas Hinz, Onsala (SE); Hans Bernler, Mölndal (SE); Carl Landberg, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 13/255,514

(22) PCT Filed: Mar. 12, 2009

(86) PCT No.: PCT/SE2009/000136
§ 371 (c)(1),
(2), (4) Date: Nov. 23, 2011

(87) PCT Pub. No.: WO2010/104422
PCT Pub. Date: Sep. 16, 2010

(65) Prior Publication Data
US 2012/0060477 A1 Mar. 15, 2012

(51) Int. Cl.
*F01N 3/00* (2006.01)
*F01N 3/035* (2006.01)
(Continued)

(52) U.S. Cl.
CPC ............ *F01N 3/035* (2013.01); *F01N 3/023* (2013.01); *F01N 3/105* (2013.01); *F01N 3/208* (2013.01); *F01N 13/009* (2014.06); *F02D 41/029* (2013.01); *F02D 41/0235* (2013.01);
(Continued)

(58) Field of Classification Search
CPC ....... F01N 3/0231; F01N 3/035; F01N 3/103; F01N 3/106; F01N 3/2053; F01N 3/2066; F01N 3/208; F01N 13/009; F01N 13/02; F02D 41/1463; F02D 41/1465; F02D 41/1467
USPC .................................................... 60/272–324
See application file for complete search history.

(56) References Cited

U.S. PATENT DOCUMENTS

2004/0206069 A1* 10/2004 Tumati et al. ................... 60/285
2005/0109022 A1* 5/2005 Nagaoka et al. ................ 60/297
(Continued)

FOREIGN PATENT DOCUMENTS

DE   10 2005 025737 A1   1/2007
EP        1 108 862 A2   6/2001
(Continued)

OTHER PUBLICATIONS

Gaertner et al., DE 102005025737 A1 Translation, Jan. 11, 2007.*
(Continued)

*Primary Examiner* — Thomas Denion
*Assistant Examiner* — Kelsey Stanek
(74) *Attorney, Agent, or Firm* — WRB-IP LLP

(57) ABSTRACT

An operating method of an exhaust gas aftertreatment system including at least a particulate filter for retaining soot from the exhaust gas of an engine and a deNOx catalytic converter for reducing nitrogen oxide in the exhaust gas of the engine is provided. Operation regimes of the particulate filter and of the deNOx catalytic converter are synchronized with respect to each other for performing regeneration of the particulate filter while the catalytic converter provides a nitrogen oxide conversion efficiency above a predetermined limit.

13 Claims, 6 Drawing Sheets

(51) Int. Cl.
*F01N 3/023* (2006.01)
*F01N 3/10* (2006.01)
*F01N 3/20* (2006.01)
*F02D 41/02* (2006.01)
*F01N 13/00* (2010.01)
*F01N 9/00* (2006.01)
*F02D 41/14* (2006.01)
*F02D 41/40* (2006.01)

(52) U.S. Cl.
CPC ............ *F02D41/1448* (2013.01); *F01N 9/002* (2013.01); *F01N 2430/00* (2013.01); *F01N 2560/026* (2013.01); *F01N 2560/06* (2013.01); *F01N 2560/08* (2013.01); *F01N 2900/1621* (2013.01); *F02D 41/025* (2013.01); *F02D 41/0245* (2013.01); *F02D 41/1446* (2013.01); *F02D 41/405* (2013.01); *F02D 2200/0812* (2013.01); *Y02T 10/24* (2013.01)

(56) References Cited

U.S. PATENT DOCUMENTS

2007/0012032 A1* 1/2007 Hu .................................. 60/286
2008/0250778 A1* 10/2008 Solbrig ........................... 60/301
2008/0289321 A1* 11/2008 Lu et al. ......................... 60/299
2010/0139250 A1* 6/2010 Andersson et al. ............. 60/285
2011/0000190 A1* 1/2011 Svensson et al. ............... 60/274
2011/0011068 A1* 1/2011 Ren et al. ........................ 60/297

FOREIGN PATENT DOCUMENTS

| EP | 1882829 A1 | 1/2008 |
| JP | 2002 021623 A | 1/2002 |
| JP | 2004 138022 A | 5/2004 |
| WO | 9939889 A1 | 8/1999 |
| WO | 2008103109 A1 | 8/2008 |
| WO | WO 2008103111 A1 * | 8/2008 |
| WO | 2008127156 A1 | 10/2008 |

OTHER PUBLICATIONS

International Search Report for correspondinig International Application PCT/SE2009/000136.
International Preliminary Report on Patentbility for corresponding International Application PCT/SE2009/000136.
European Search Report (Sep. 18, 2015) for corresponding European App. EP 09 84 1587.

* cited by examiner

OPERATING METHOD FOR AN EXHAUST AFTERTREATMENT SYSTEM AND EXHAUST AFTERTREATMENT SYSTEM

BACKGROUND AND SUMMARY

The invention relates to an operating method for an exhaust aftertreatment system and an exhaust aftertreatment.

Exhaust aftertreatment systems are used to reduce vehicular emissions. Future legislation for diesel engines of commercial vehicles such as heavy duty trucks, demands to reduce emissions. A particulate filter system can be used to reduce the soot emission of the vehicle. Typically, after a driving time of several days up to several weeks the particle filter is full and has to be regenerated.

An exhaust aftertreatment system is disclosed in EP-A 1-1 882 829 wherein an oxidation catalyst is arrange upstream of a diesel particulate filter. The system further comprises means for detecting the quantity of particulate matter in the filter and a regeneration signal is sent when the amount of particle exceeds a limit. In order to regenerate the filter, relevant engine parameters are controlled such that a desired temperature is reached. Regeneration of the particulate filter can also be manually triggered. To increase the exhaust temperature for regeneration, unburned fuel can be injected into the exhaust gas.

It is desirable to provide a method for operating an exhaust gas aftertreatment system which allows for controlled particle filter regeneration. It is also desirable to provide an improved aftertreatment system.

An operating method of an exhaust gas aftertreatment system is proposed, which system comprises at least a particulate filter for retaining soot from the exhaust gas of an engine and a deNOx catalytic converter for reducing nitrogen oxide in the exhaust gas of the engine. Operation regimes of the particulate filter and of the deNOx catalytic converter are synchronized with respect to each other for performing regeneration of the particulate filter while the catalytic converter provides a nitrogen oxide conversion efficiency above a predetermined limit.

The operation regimes of the particulate filter and of the deNOx catalytic converter can be synchronized so that the particulate filter can be regenerated at favourable operation conditions of the deNOx catalytic converter and the particulate filter. This can be done when the soot level of the particulate filter has reached a predetermined value or at times the deNOx catalytic filter operates in a favourable operation regime. Favourably, the engine can be set to run in a mode with increased output of nitrogen oxide NOx and higher exhaust gas temperatures. Preferably, nitrogen dioxide NO2 instead of oxygen is provided for burning soot in the particulate filter. This will activate a NO2-based regeneration of the particulate filter, wherein NO2 oxidizes the soot accumulated in the particulate filter. After the soot level in the particulate filter is reduced to a desired level, the engine mode can return to normal operation conditions with a normal generation level of NOx and lower exhaust gas temperatures.

The active regeneration of the particulate filter with NO2 can be done when the engine as well as the vehicle is in a running mode. The activation of the NO2-based regeneration of the particulate filter can be triggered even in stand-still conditions while the vehicle is parked. For instance, the driver can activate the regeneration manually by pressing a button or a switch which accordingly sets the engine in a mode with an increased NOx generation and a higher exhaust gas temperature. Preferably, the particulate filter regeneration is done when there is sufficient NO2 in the exhaust gas at a sufficient high temperature.

Advantageously such an operation mode ("heat mode") of the engine can be enforced by a proper adjustment of exhaust gas recirculation, air mass flow (e.g. by adjusting a turbine geometry of a Variable Geometry Turbine (VGT)), post injection of hydrocarbon into the exhaust gas, intake throttle setting and/or Exhaust Pressure Governor (EPG) device.

Favourably, the heat mode of the engine is controlled in a way to generate exhaust gas temperatures within an upper and a lower limit. Expediently, the upper temperature limit can be set by the deNOx catalyst due to detrimental effects of catalyst aging if the catalyst is exposed to too high temperatures, and the lower temperature limit can be set by the deNOx catalyst due to detrimental effects on emission abatement during particulate filter regeneration.

At the same time, if the operation regime of the deNOx catalytic converter converts the nitrogen oxides NOx with high efficiency, the regeneration of the particulate filter can be emission neutral or at least varied within predetermined limits. Synchronization of the regeneration operation regime of the particulate filter with the operation regime of the deNOx catalytic converter with high NOx conversion, particularly over selective catalytic reduction (SCR), can be triggered by the determination of the NOx conversion over the deNOx catalytic converter. This can be easily done for instance via two NOx sensors, one upstream and one downstream of the deNOx catalytic converter. The NOx sensor upstream of the deNOx catalytic converter can be a virtual sensor, i.e. the "signal" of the virtual is derived from operation parameters of the engine and the components between the engine and the deNOx catalytic converter, or a real sensor. Preferably, the NOx sensor downstream of the deNOx catalytic converter is a real sensor. Expediently, the two NOx sensors can be coupled with a timer and/or a differential pressure sensor determining the soot load of the particulate filter.

Favourably, a risk of a spontaneous soot combustion resulting in very high temperatures and filter damage can be avoided. The particulate filter can be regenerated actively in a controlled manner. Preferably, the filter regeneration is done by oxidizing the soot in the particulate filter with nitrogen dioxide (NO2). Such active soot regeneration can be performed at low temperatures in the range 300° C. to 350° C. In contradistinction to this, an active regeneration with oxygen would require much higher temperatures of above 600° C. which may have a detrimental effect on catalytic converters downstream of the particulate filter.

Advantageously, a higher soot load of the particulate filter can be tolerated as well as longer regeneration intervals without a risk of damaging the particulate filter. Particularly, oxidation of the complete soot load in the particulate filter is not necessary as the particulate filter regeneration can be interrupted when necessary. The particulate filter regeneration can be easily resumed at a later time. In contradistinction to this, regeneration with oxygen instead of NO2 would require oxidizing all soot in the particulate filter generating high exhaust gas temperatures without the possibility to stop regeneration.

The method can be performed at relatively low temperatures. Therefore, components in the exhaust gas aftertreatment system can be prevented from damage caused by high temperatures. Aging of catalytic converters, e.g. a diesel oxidation catalyst, can be reduced. Particularly, aging of components downstream of the particulate filter can be reduced.

Favourably, if an increase of the exhaust gas temperature has to be achieved, hardware for raising temperature in the form of an increased back pressure device, such as a butterfly valve, can minimize or even avoid the necessity of a hydrocarbon injection into the exhaust gas.

According to a favourable method step of an aspect of the invention, the operation regimes can be synchronized with respect to at least one of operation temperature of the particulate filter and/or the deNOx catalytic converter; exhaust gas composition; timing of adjusting at least one of the operation regimes. Favourably, an appropriate temperature range for a proper and efficient operation the deNOx catalytic converter as well as a sufficient amount of NO2 as oxidant for the soot in the particulate filter can be achieved.

According to a favourable method step of an aspect of the invention, dosing of a reductant upstream of the deNOx catalytic converter can be modified such that a nitrogen oxide emission is kept constant or modified within determined boundaries. Advantageously, the regeneration of the particulate filter can be performed virtually neutral with respect to emissions.

According to a favourable method step of an aspect of the invention, an operation temperature of the exhaust gas downstream of the particulate filter and upstream of the deNOx catalytic converter can be limited to an upper temperature tolerable for the deNOx catalytic converter. Aging of the deNOx catalytic converter due to exposure to high exhaust gas temperatures can be reduced.

According to a favourable method step of an aspect of the invention, an operation temperature of the exhaust gas downstream of the particulate filter and upstream of an additional catalytic converter can be limited to an upper temperature tolerable for the additional catalytic converter. Aging of the additional catalytic converter due to exposure to high exhaust gas temperatures can be reduced. Such an additional catalytic converter can be an oxidation catalytic converter for oxidizing residual reductants like hydrocarbons and/or ammonia in the exhaust gas. Such catalytic converter is sometimes also known as clean-up catalytic converter.

According to a favourable method step of an aspect of the invention, the operation regime of the particulate filter and/or the catalytic converter can be compensated for an aging effect of one or more components of the exhaust gas aftertreatment system. Advantageously, the regeneration of the particulate filter and the emissions can be optimized.

According to a favourable method step of an aspect of the invention, the operation regimes of the particulate filter and the deNOx catalytic converter can be synchronized continuously at least during operation of the engine. The particulate filter can be regenerated at times when the deNOx catalytic converter is in a highly efficient mode for conversion of NOx to nitrogen and water. Regeneration can be stopped when the operation conditions of the deNOx catalytic converter starts to be less efficient. Regeneration of the particulate filter can be resumed as soon as the deNOx catalytic converter reaches a high efficient conversion mode again. Averaged over time, the particulate filter can be kept in a state with low soot load.

According to a favourable method step of an aspect of the invention, the operation regimes of the particulate filter and the deNOx catalytic converter can be synchronized on a periodic basis at least during operation of the engine. The regeneration mode of the particulate filter can be performed at well defined times which can be chosen according to desired operation modes or ambient conditions of the vehicle or the like.

According to another aspect of an aspect of the invention an exhaust gas aftertreatment system for performing the inventive method is proposed, wherein a control unit is provided which is adapted to synchronize operation regimes of the particulate filter and of the deNOx catalytic converter with respect to each other for increasing an amount of nitrogen oxide for oxidizing soot in the particulate filter and enhancing the nitrogen oxide conversion in the catalytic converter during a regeneration phase of the particulate filter. Expediently, a controlled regeneration of the particulate filter can be achieved which is virtually neutral for emissions. The particulate filter regeneration can be stopped in a controlled way and resumed if desired. Regeneration can be triggered actively by providing a sufficient amount of nitrogen dioxide in the exhaust gas. The regeneration of the particulate filter can be performed with nitrogen oxide which can oxidize soot at comparatively low temperatures between e.g. 300° C.-350° C. in contradistinction to regeneration with oxygen which is operable at much higher temperatures in the range of 600° C.-650° C. Thus, overheating of the exhaust gas can be avoided.

According to a favourable embodiment of an aspect of the invention, the deNOx catalytic converter can be a selective catalytic reduction catalytic converter. A selective catalytic reduction (SCR) catalytic converter can convert NOx efficiently to nitrogen and water.

According to a favourable embodiment of an aspect of the invention, an oxidation catalyst can be arranged between the particulate filter and the deNOx catalytic converter. The oxidation catalyst can oxidize carbon monoxide and hydrocarbons as well as NO to NO2.

According to a favourable embodiment of an aspect of the invention, the particulate filter can be arranged upstream of the deNOx catalytic converter, thereby protecting the deNOx catalytic converter performance of being influenced negatively by so-called catalyst poisons, which in the case of the SCR-catalyst can be potassium, phosphorus, sulphur, soot, hydrocarbons, etc.

According to a favourable embodiment of an aspect of the invention, the particulate filter can be arranged downstream of the deNOx catalytic converter reducing the thermal mass upstream of the deNOx catalytic converter. This measure allows the deNOx catalytic converter to have a favourable light-off temperature in regard to NOx, conversion in low temperature driving cycles or cold start conditions due.

According to a favourable embodiment of an aspect of the invention, a clean-up catalyst can be arranged downstream of the particulate filter, deNOx catalytic converter and the oxidation catalytic converter. The clean-up catalytic converter can e.g. eliminate a possible amount of ammonia in the exhaust gas which slipped through the deNOx catalytic converter.

The invention can be used, according to aspects thereof, preferably in commercial vehicles such as trucks of the high duty, medium or low duty type.

BRIEF DESCRIPTION OF THE DRAWINGS

The present invention may best be understood from the following detailed description of the embodiments of the invention, but not restricted to these embodiments, wherein is shown schematically.

DETAILED DESCRIPTION

Figure 1:
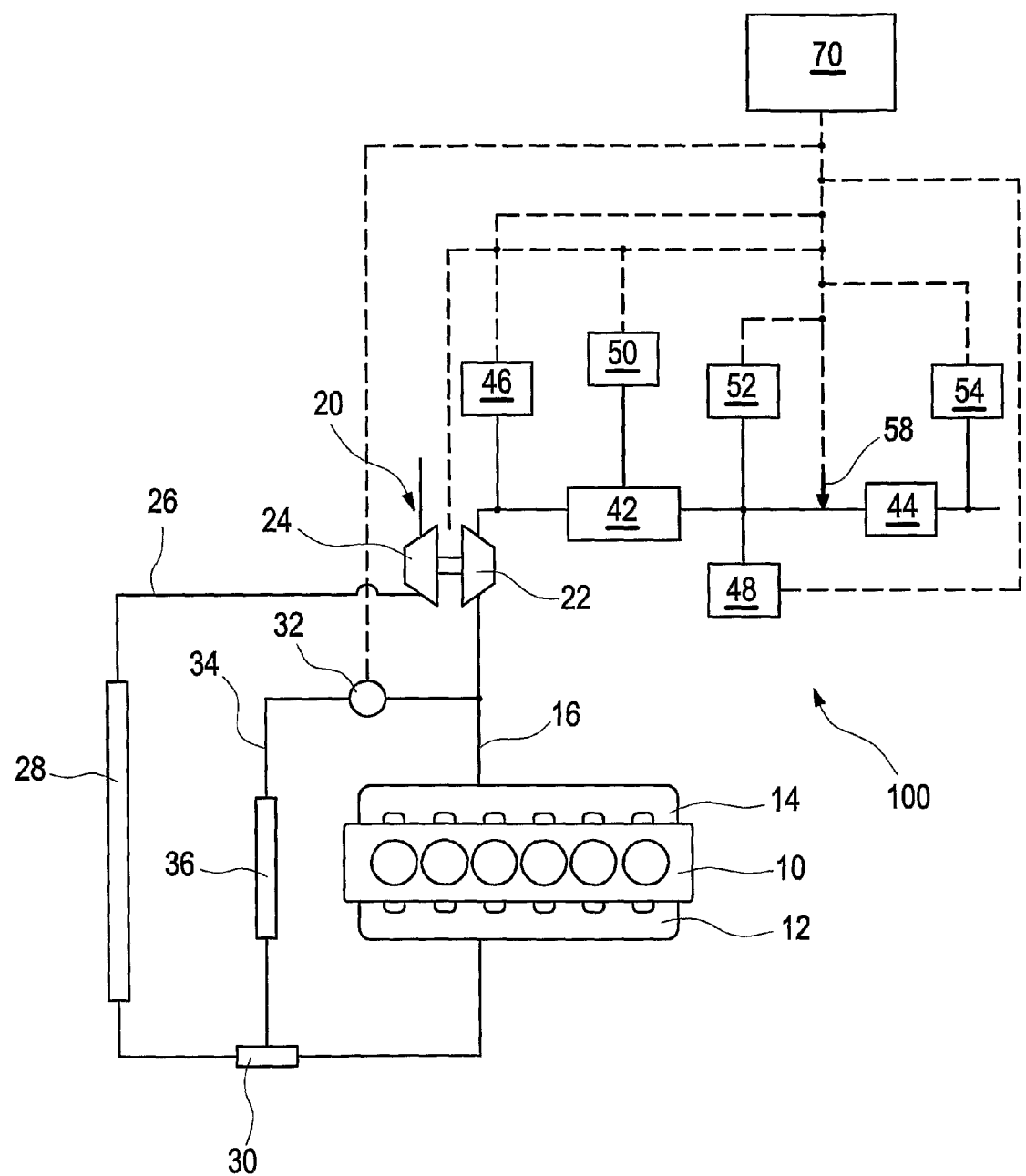
FIG. 1 a sketch of an exhaust gas aftertreatment system according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 depicts a sketch of an exhaust gas aftertreatment system 100 according to an aspect of the invention. An engine 10 is equipped with an EGR system for exhaust gas recirculation transferring exhaust gas from an exhaust manifold 14 to an inlet manifold 12 of the engine 10 through a recirculation line 34.

During normal operation of the engine 10 inlet air is led via a compressor 24 of a turbocharger 20, inlet line 26 and a charge air cooler 28 to an EGR mixing chamber 30. In the EGR mixing chamber 30 the inlet air is mixed with a part of the exhaust gas coming from the exhaust line 16 and let through the recirculation line 34 and an ECGR cooler 36. An EGR valve 32 controls the EGR mass flow and thus the engine out NOx emissions. The term NOx comprises nitrogen monoxide NO and nitrogen dioxide NO2. The exhaust gas flow is led via the exhaust line 16 passing a turbine 22 of the turbocharger 20 towards a diesel particulate filter 42 for particulate control and a deNOx catalytic converter 44, e.g. an SCR catalytic converter, for NOx in tailpipe control. Upstream of the deNOx catalytic converter 44 an injector 58 can be arranged. The injector 58 can inject a reductant, e.g. urea or ammonia, into the exhaust gas stream, which helps the reduction of NOx to N2 over the catalyst in the deNOx catalytic converter 44.

Upstream of the particulate filter 42 an oxidation catalytic converter (not shown) can be arranged which oxidizes NO in the exhaust gas to NO2 which can be used in the particulate filter 42. For generating heat the oxidation catalytic converter can also burn hydrocarbon which can be injected into the exhaust gas stream.

In an embodiment not shown, components of the exhaust gas aftertreatment system 100 can be arranged in the order oxidation catalytic converter-diesel particulate filter-oxidation catalytic converter (optional)-deNOx catalytic converter-clean-up catalytic converter (optional).

In another embodiment not shown, components of the exhaust gas aftertreatment system 100 can be arranged in the order oxidation catalytic converter-deNOx catalytic converter-oxidation catalytic converter (optional)-diesel particulate filter-clean-up catalytic converter (optional).

After passing the units in the exhaust gas aftertreatment system 100, the clean exhaust gas is discharged into the environment.

A control unit 70 is coupled to a number of sensors and components of the exhaust aftertreatment system 100. Although the control unit 70 is depicted as a single component multiple control units can be provided instead coupled to the sensors and components.

The control unit 70 is connected to a temperature sensor 46 upstream of the particulate filter 42 and a temperature sensor 48 downstream of the particulate filter 42 and upstream of the deNOx catalytic converter 44. A differential pressure sensor 50 delivers information related to the load state of the particulate filter 42. Upstream and downstream of the deNOx catalytic converter 44 NOx sensors 52, 54 are arranged which provide information related to the amount of NOx in the exhaust gas. Further the control unit 70 can be coupled to the EGR valve 32 and to the turbocharger 20.

The NOx sensor upstream 52 of the deNOx catalytic converter 44 can be a virtual sensor, i.e. the "signal" of the virtual is derived from operation parameters of the engine and the components between the engine 10 and the deNOx catalytic converter 44, or a real sensor. Preferably, the NOx sensor 54 downstream of the deNOx catalytic converter 44 is a real sensor. By coupling the two NOx sensors 52, 54 with a timer and/or the differential pressure sensor 50 which determines the soot load of the particulate filter 42, the operational regime of the deNOx catalytic converter 44 with high NOx conversion can be sensed.

Future engines applying new concepts for combustion and exhaust gas emission control as well as increasing their fuel efficiency significantly will result in lower exhaust gas energy being available to keep the components in the exhaust gas aftertreatment system 100 working properly, i.e. the temperature in the exhaust gas aftertreatment system 100 is low. Already today specific driving cycles exhibit the same type of problem, e.g. bus cycles, garbage truck cycles, as illustrated in FIG. 2a.

Figure 2:
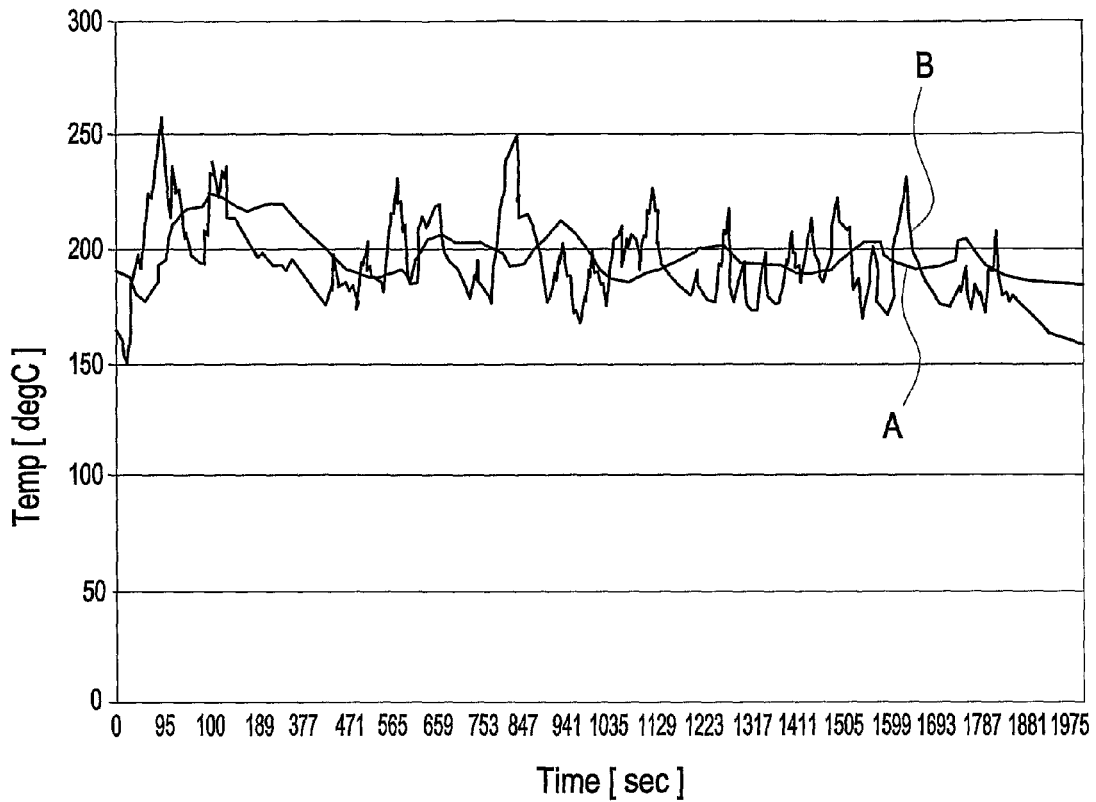
FIG. 2a, 2b a generic temperature profile in dynamic cycle simulating low temperature cycles (FIG. 2a) and a curve showing soot accumulation and regeneration, wherein soot is accumulated during an engine operation cycle with such a temperature profile (FIG. 2b)
Figure 2:
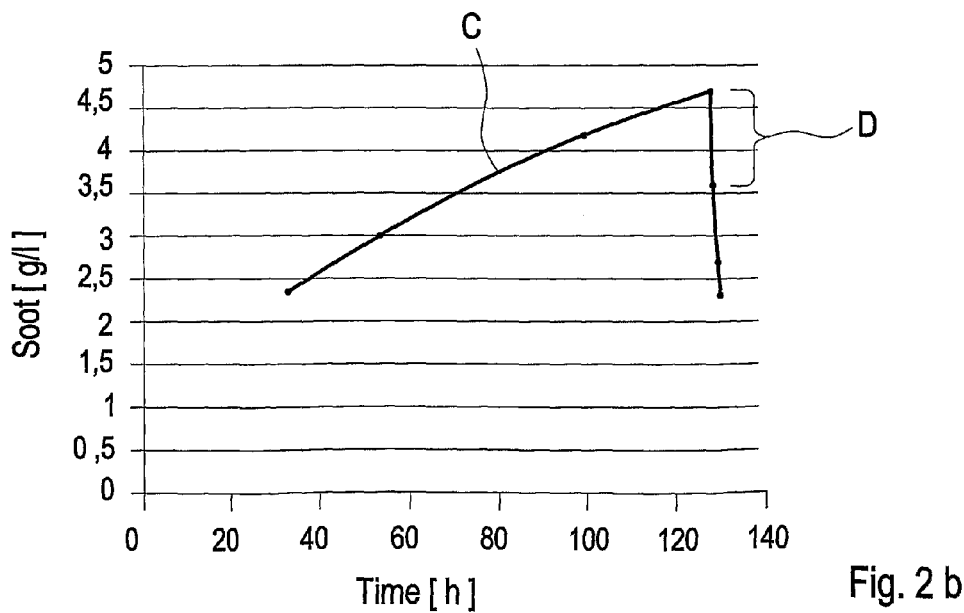

FIG. 2a shows a generic temperature profile in a dynamic cycle simulating low temperature cycles, while FIG. 2b depicts a curve representing soot accumulation and regeneration, wherein soot is accumulated during an engine operation cycle with such a temperature profile shown in FIG. 2a, the low temperature cycles encountered for example in inner city driving, typical for e.g. a garbage truck cycle or a bus cycle.

Curve A displays the exhaust gas temperature discharged from the engine (10 in FIG. 1) and curve B the exhaust gas temperature of the exhaust gas exiting the particulate filter (42 in FIG. 1). The temperatures of the exhaust gas are low close to 2000 C.

Curve C in FIG. 2b shows how the soot is accumulated in the particulate filter (42 in FIG. 1) during such a dynamic cycle shown in FIG. 2a. Curve D shows the result of a NO2 based regeneration wherein soot accumulated in the particulate filter (42 in FIG. 1) is oxidized by NO2 for 30 minutes.

Figure 3:
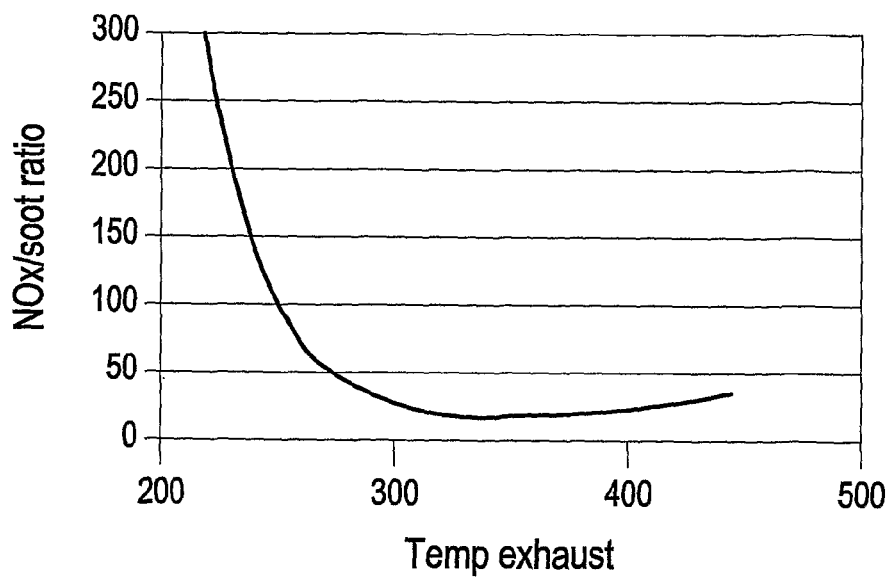
FIG. 3 an example of a required NOx/soot ratio as a function of exhaust temperature for NO2 based soot burning.

The low engine out temperatures in combination with the required engine out NOx emissions needed to meet the stringent emission legislations of the future preclude the application of passive continuous regeneration (CRT regeneration) for the regeneration of the particulate filter (42 in FIG. 1). As can be seen in FIG. 3, the ratio of soot vs. NOx (soot/NOx) and the temperature prevailing in the particulate filter (42 in FIG. 1) may not be sufficient in many driving cycles of the vehicle. The required amount of NO2 for oxidizing soot increases strongly with decreasing exhaust gas temperatures and is comparably low at temperatures above 3000 C. The passive CRT regeneration may take place at temperatures well above 300° C.

With reference to FIG. 1, according to an aspect of the invention an operating method is proposed for an exhaust gas aftertreatment system 100 comprising at least a particulate filter 42 for retaining soot from the exhaust gas of an engine 10 and a deNOx catalytic converter 44 for reducing nitrogen oxide in the exhaust gas of the engine 10 is proposed, wherein operation regimes of the particulate filter 42 and of the deNOx catalytic converter 44 are synchronized with respect to each other for increasing an amount of nitrogen oxide for oxidizing soot in the particulate filter 42 and/or enhancing the nitrogen oxide conversion in the catalytic converter 44 during a regeneration phase of the particulate filter 42. There are several possibilities for addressing the issues of low NOx content (and consequently low NO2 content) and temperature.

One favourable possibility to increase the exhaust gas temperature is to change the combustion mode of the engine 10 thus increasing the NOx engine out emissions by decreasing the EGR flow. This measure results in a more efficient combustion generating higher energy and in the same time less energy lost in the cooling system via the EGR cooler 36. More energy is available via the exhaust mass flow to the exhaust gas aftertreatment system 100.

Another favourable possibility to increase the exhaust gas temperature comprises for instance a throttle of the inlet air to the engine, the use of a Discharge Recirculation Valve (DRV) over the turbo machinery, the use of a hydrocarbon injector in the exhaust gas line, late-post injection of fuel into the cylinder of the engine or a separate burner which burns additional hydrocarbon etc.

Another favourable possibility to increase the exhaust gas temperature comprises the change of urea injection characteristics lowering the ammonia content in the exhaust system affecting the total heat needed for evaporation of urea and its dissociation into ammonia and water.

By increasing the exhaust gas temperature a NO2-based particulate filter regeneration can be achieved under engine conditions which normally do not allow such a NO2-based regeneration. The NO2-based regeneration can be actively-triggered and needs not to applied continuously as in the CRT regeneration process. The active NO2-based regeneration is optional and emission neutral and highly dependent on the NOx reduction efficiency of the deNOx catalytic converter 44, i.e. the conversion efficiency of the deNOx catalytic converter 44, e.g. an SCR catalytic converter.

The conversion efficiency of the deNOx catalytic converter 44 depends on the minimum temperature for allowing the chemical reactions reducing NOx to N2 over the catalyst in the deNOx catalytic converter 44. In case of using urea as reductant a determining parameter is the temperature for the hydrolysis of urea to ammonia which is enabled at about 200° C. to 250° C. The use of SCR catalysts being able to store ammonia can lower the temperature of the conversion reaction of NOx to N2 to below 200° C. which is also very convenient for cold start.

Examples for catalysts being capable of storing ammonia are zeolite based material, e.g. Fe-containing zeolites or Cu-containing zeolites, as well as vanadium-containing extrudates.

On the other hand as many of the SCR catalysts which are capable of storing ammonia are zeolite based, it is highly favourable to avoid overshooting the maximum allowable temperature for extensive aging of such SCR catalysts.

The maximum temperature is determined by the material characteristics of the delNIOx catalytic converter 44 and/or a clean-up catalytic converter which may be provided and is typically in the range of 600° C.-650° C.

For oxygen-based regeneration of the particulate filter 42 temperatures well above 600° C. are necessary wherein the control of the regeneration process is extremely difficult. The maximum temperature can be monitored by the temperatures sensors 46, 48. If fuel additives, e.g. cerium oxides, are used to facilitate oxygen based regeneration at temperatures below than 600° C., it is still very important to avoid a temperature rise during regeneration above the maximum temperature. Thus, NO2-based regeneration is superior to oxygen based regeneration at low temperatures.

Figure 4:
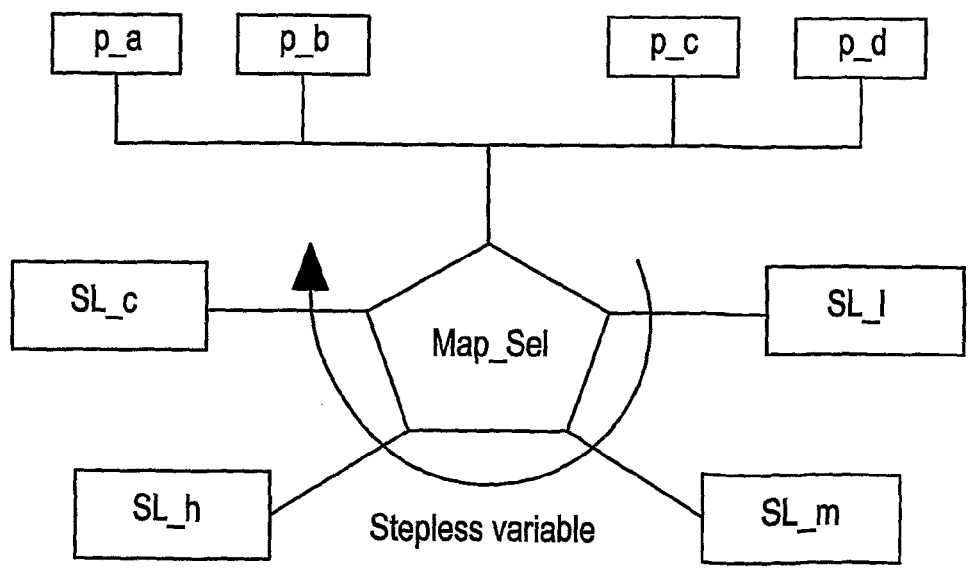
FIG. 4 a schematic representation for soot trigger levels activating an active NO2-based particulate filter regeneration event with several input parameters.
Figure 5:
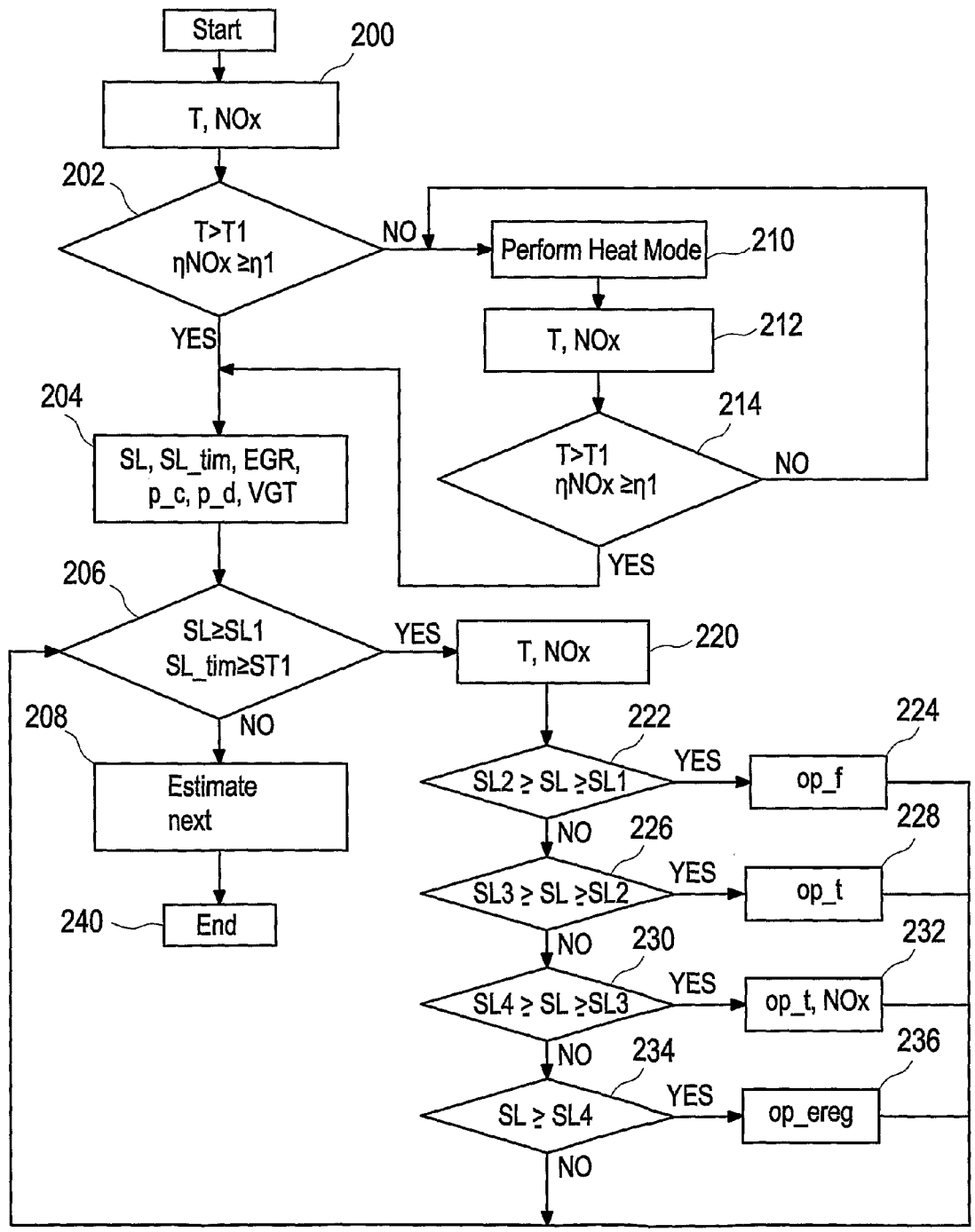
FIG. 5 a flow chart illustrating regeneration logic trigger based on the performance in NOx reduction of a SCR catalytic converter.
Figure 6:
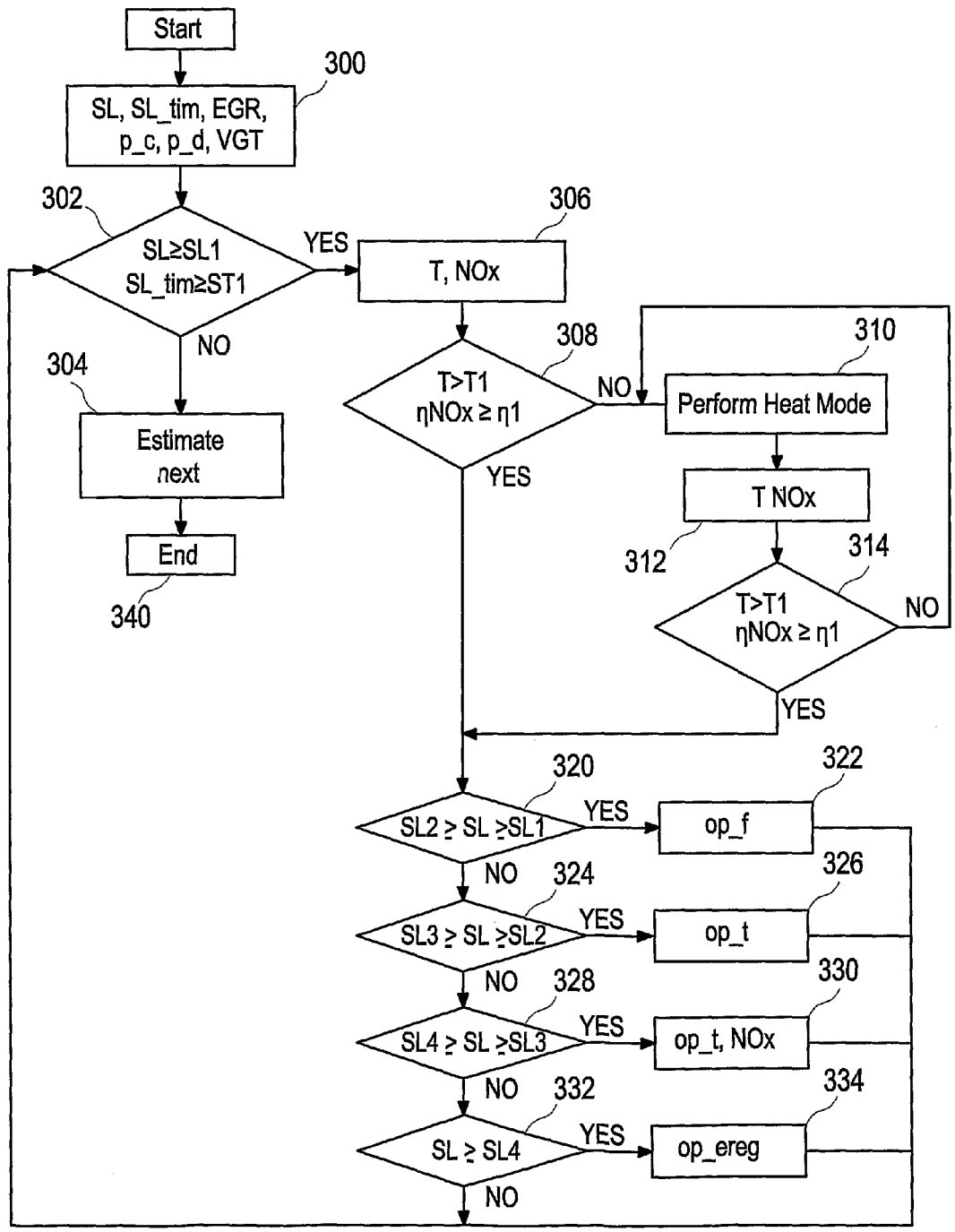
FIG. 6 a flow chart illustrating regeneration logic trigger based on soot load in a diesel particulate filter.

When an active NO2-based regeneration of the particulate filter 42 is to be performed, the regeneration event depends on the soot loading within the particulate filter 42 and the NOx conversion of the deNOx catalytic converter 44, as is shown in more detail in FIGS. 4, 5 and 6.

In general, the allowable soot loading for an active NO2-based regeneration according to an aspect of the invention is higher than for an oxygen-based regeneration because the temperature rise generated by the exotherm oxidation reaction as a function of time is lower for the NO2-based than for the oxygen-based regeneration event. Favourably, exceeding the maximum temperature during regeneration of the particulate filter 42 with NO2 can easily be prevented.

FIG. 4 depicts a schematic representation for soot trigger levels activating an active NO2-based particulate filter regeneration event with several input parameters such as EGR input parameter p_a, VGT input parameter p_b, timing parameter p_c, needle opening pressure (NOP) parameter p_d.

Four levels of soot loading SL are defined, i.e. low soot loading SLJ, medium soot loading SL_m, high soot loading SL_h, critical soot loading SL_c. The soot loading levels correspond to different engine optimization characteristics, wherein low soot loading SLJ corresponds to fuel optimized engine characteristics (op J), medium soot loading SL_m corresponds to temperature optimized engine characteristics (op J), high soot loading SLJi corresponds to temperature and NOx or NO2 optimized engine characteristics (op J, NOx, and critical soot loading SL_c corresponds to an emergency regeneration with NOx engine characteristics (op_ereg).

Based on the input parameters, the desired engine optimization characteristics can be selected from an engine map (map_sel) which may be contained in an engine controller. The parameters can be selected steplessly, i.e. instead of choosing distinct levels, it is possible to choose interpolated values, e.g. 1, 5; 1, 6; 1.7 instead of just 1 or 2 etc.

FIG. 5 shows a flow chart illustrating regeneration logic trigger based on the performance in NOx reduction of a SCR catalytic converter 44. The reference numbers given for the components of the exhaust gas aftertreatment system 100 refer to the components shown in FIG. 1.

In step 200 the temperature sensor and NOx sensor signals are read (temperature sensors 46, 48, NOx sensors 52, 54 in FIG. 1). In step 202 it is checked if the actual temperature is equal or larger than a predetermined minimum temperature T1 upstream of the deNOx catalytic converter 44 and/or particulate filter 42.

Particularly it is possible to use T-signals from both positions. If a NOx conversion efficiency ηJvIOx in the deNOx catalytic converter 44 is equal or larger than a predetermined minimum efficiency η1.

If both requirements are fulfilled ("yes" in the flow chart), the process continues with step 204 and soot load SL, soot timer SL_tim, the amount of recirculated exhaust EGR, needle opening pressure (NOP) parameter p_d and the state of the variable geometry turbine VGT are read. The state can be described by various parameters, e.g. turbine speed, turbine opening degree of baffles, gas pressure and gas temperature, etc.

If in step 202 both the temperature and the NOx conversion are below their required levels ("no" in the flow chart), a heat mode is triggered in step 210. In the heat mode the engine is set to run in a mode with increased output of nitrogen oxide NOx and higher exhaust gas temperatures. The heat mode can comprise a proper adjustment of exhaust gas recirculation, air mass flow (e.g. by adjusting a turbine geometry of a variable geometry turbine (VGT)), post injection of hydrocarbon into the exhaust gas, intake throttle setting and/or EPG device. The EPG device (EPG=Exhaust Pressure Governor) it is a device creating backpressure that let the engine work harder.

At the end of the heat mode, the temperature sensor and NOx sensor signals are read again in step 212. In step 214 it is checked if now the actual temperature is equal or larger than a predetermined minimum temperature T1 upstream of the particulate filter 42 and if now the NOx conversion efficiency η_NOx in the deNOx catalytic converter 44 is equal or larger than a predetermined minimum efficiency η1. If this is not the case ("no" in the flow chart), the routine jumps back to step 210 and the sequence of step 210, 212 and 214 is repeated. If the minimum temperature T1 and the minimum efficiency η1 are exceeded ("yes" in the flow chart), the routine jumps to step 204 and soot load SL, soot timer SL_tim, the amount of recirculated exhaust EGR, needle opening pressure (NOP) parameter p_d and the state of the variable geometry turbine VGT are read. The state can be described by various parameters, e.g. turbine speed, turbine opening degree of baffles, gas pressure and gas temperature, etc.

In step 206 it is checked if the soot load SL is equal or larger than a predetermined first level SL1 (low level) and/or the soot timer SLJim is equal or larger than a predetermined time parameter ST1. If the first soot level SL1 and/or the predetermined time for soot regeneration ST1 is not reached ("no" in the flow chart), a next occasion of performing the control sequence is estimated in step 208. The routine then ends in step 240.

If the first soot level SL1 and/or the predetermined time for soot regeneration ST1 is reached in step 206 ("yes" in the flow chart) the routine continues with step 220 and depending on the soot load SL will proceed with a desired engine optimization characteristics is selected in an engine map of an engine controller.

In step 220 the temperature sensor and NOx sensor signals are read. In subsequent step 222, it is checked if the soot load SL is within the first low level SL1 and a second minimum soot load SL2. If the soot load is within the limits ("yes" in the flow chart), a fuel optimized engine characteristic op_f is selected in the engine map in step 224. The routine then jumps to step 206 where it is decided to either proceed with steps 208 and 240 or to go back to step 220 and continue with step 222.

If in step 222 it is decided that the soot load SL is outside the limits ("no" in the flow chart) it is checked in step 226 if the soot load is within the second medium soot load SL2 and a third high soot load SL3. If this is the case ("yes" in the flow chart), a temperature optimized engine characteristic op_t is selected in the engine map in step 228 and the routine jumps to step 206 where it is decided to either proceed with steps 208 and 240 or to go back to step 220 and continue with step 222.

If in step 226 it is decided that the soot load SL is outside the limits ("no" in the flow chart) it is checked in step 230 if the soot load is within the third high soot load SL3 and a fourth critical soot load SL4. If this is the case ("yes" in the flow chart), a temperature and NOx optimized engine characteristic op_t,NOx is selected in the engine map in step 232 and the routine jumps to step 206 where it is decided to either proceed with steps 208 and 240 or to go back to step 220 and continue with step 222.

If in step 230 it is decided that the soot load SL is outside the limits ("no" in the flow chart) it is checked in step 234 if the soot load is larger than the fourth critical soot load SL4. If this is the case ("yes" in the flow chart), an emergency NOx optimized engine characteristic op_ereg is selected in the engine map in step 236 and the routine jumps to step 206 where it is decided to either proceed with steps 208 and 240 or to go back to step 220 and continue with step 222.

If in step 230 it is decided that the soot load SL is below the critical soot load SL4, ("no" in the low chart), the routine jumps back to step 206 where it is decided to either proceed with steps 208 and 240 or to go back to step 220 and continue with step 222.

FIG. 6 depicts a flow chart illustrating regeneration logic trigger based on soot load in the diesel particulate filter 42. The reference numbers given for the components of the exhaust gas aftertreatment system 100 refer to the components shown in FIG. 1.

In step 300 the soot load SL, soot timer SLJim, the amount of recirculated exhaust EGR, needle opening pressure (NOP) parameter p_d and the state of the variable geometry turbine VGT are read. The state can be described by various parameters, e.g. turbine speed, turbine opening degree of baffles, gas pressure and gas temperature, etc. In step 302 it is checked if the soot load SL is equal or larger than a predetermined first level SL1 (low level) and/or the soot timer SLJim is equal or larger than a predetermined time parameter ST1. If the first soot level SL1 and/or the predetermined time for soot regeneration ST1 is not reached ("no" in the flow chart), a next occasion of performing the control sequence is estimated in step 304. The routine then ends in step 340.

If the first soot level SL1 and/or the predetermined time for soot regeneration ST1 is reached in step 302 ("yes" in the flow chart) the routine continues with step 306 where the temperature sensor and NOx sensor signals are read (temperature sensors 46, 48, NOx sensors 52, 54 in FIG. 1).

In subsequent step 308 it is checked if the actual temperature is equal or larger than a predetermined minimum temperature T1 upstream of the deNOx catalytic converter 44 and/or particulate filter 42 and if a NOx conversion efficiency η_NOx in the deNOx catalytic converter 44 is equal or larger than a predetermined minimum efficiency η1. If both requirements are fulfilled ("yes" in the flow chart), the routine continues with step 320 and depending on the soot load SL will proceed with a desired engine optimization characteristics is selected in an engine map of an engine controller.

If both the temperature and the NOx conversion are below their required levels ("no" in the flow chart) in step 308, a heat mode is performed in step 310. In the heat mode the engine is set to run in a mode with increased output of nitrogen oxide NOx and higher exhaust gas temperatures. The heat mode can comprise a proper adjustment of exhaust gas recirculation, air mass flow (e.g. by adjusting a turbine geometry of a variable geometry turbine (VGT)), post injection of hydrocarbon into the exhaust gas, intake throttle setting and/or EPG device.

At the end of the heat mode, the temperature sensor and NOx sensor signals are read again in step 312. In step 314 it is checked if now the actual temperature is equal or larger than a predetermined minimum temperature T1 upstream of the deNOx catalytic converter 44 and/or particulate filter 42 and if now the NOx conversion efficiency η_NOx in the deNOx catalytic converter 44 is equal or larger than a predetermined minimum efficiency η1. If this is not the case ("no" in the flow chart), the routine jumps back to step 310 and the sequence of step 310, 312 and 314 is repeated. If the minimum temperature T1 and the minimum efficiency η1 are exceeded ("yes" in the flow chart), the routine jumps to step 320.

In step 320 it is checked if the soot load SL is within the first low level SL1 and a second minimum soot load SL2. If the soot load is within the limits ("yes" in the flow chart), a fuel optimized engine characteristic op_f is selected in the engine map in step 322. The routine then jumps to step 302 where it is decided to either proceed with steps 304 and 340 or to go back to step 306 and continue with step 308.

If in step 320 it is decided that the soot load SL is outside the limits ("no" in the flow chart) it is checked in step 324 if the soot load is within the second medium soot load SL2 and a third high soot load SL3. If this is the case ("yes" in the flow chart), a temperature optimized engine characteristic op_t is selected in the engine map in step 326 and the routine jumps to step 302 where it is decided to either proceed with steps 304 and 340 or to go back to step 306 and continue with step 308.

If in step 324 it is decided that the soot load SL is outside the limits ("no" in the flow chart) it is checked in step 328 if the soot load is within the third high soot load SL3 and a fourth critical soot load SL4. If this is the case ("yes" in the flow chart), a temperature and NOx optimized engine characteristic op_t,NOx is selected in the engine map in step 330 and the routine jumps to step 302 where it is decided to either proceed with steps 304 and 340 or to go back to step 306 and continue with step 308.

If in step 328 it is decided that the soot load SL is outside the limits ("no" in the flow chart) it is checked in step 332 if the soot load is larger than the fourth critical soot load SL4. If this is the case ("yes" in the flow chart), an emergency NOx optimized engine characteristic op_ereg is selected in the engine map in step 334 and the routine jumps to step 302 where it is decided to either proceed with steps 304 and 340 or to go back to step 306 and continue with step 308.

If in step 332 it is decided that the soot load SL is below the critical soot load SL4, ("no" in the low chart), the routine jumps back to step 302 where it is decided to either proceed with steps 304 and 340 or to go back to step 306 and continue with step 308.

Figure 7:
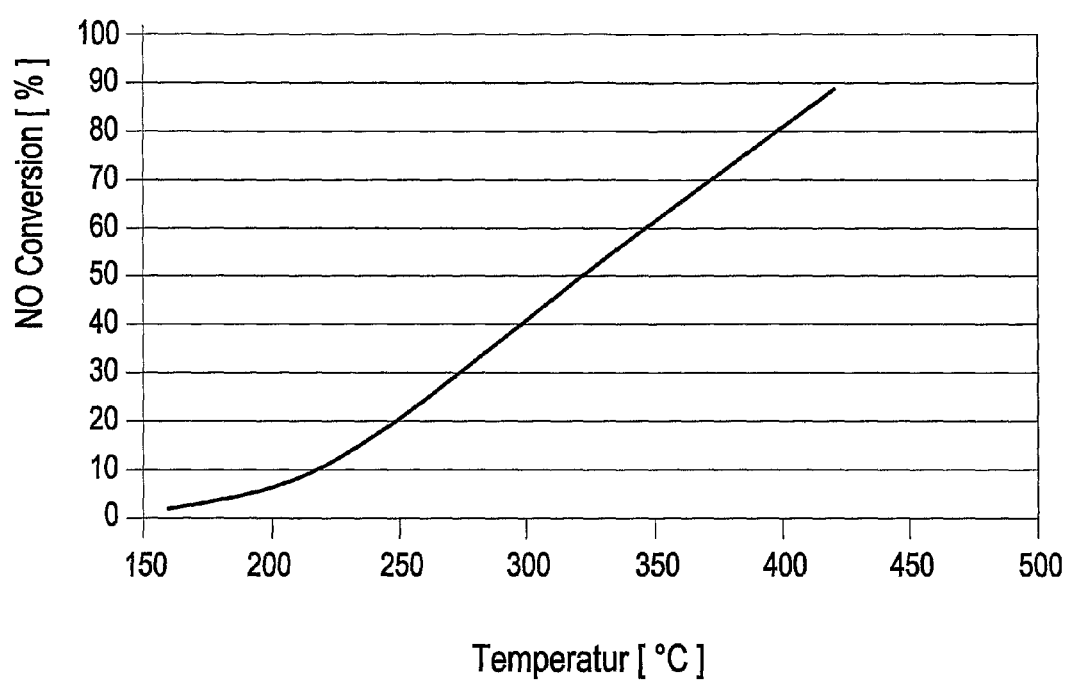
FIG. 7 a curve illustrating the probability of NO2 conversion on a soot particle as a function of temperature for a filter loaded with soot.

FIG. 7 displays a curve illustrating the probability of NO2 conversion on a soot particle as a function of temperature for a filter loaded with soot. By way of example, the particulate filter is loaded with 2 g/l soot. As can be seen, the probability of NO2 conversion is low at low temperatures and high at high temperatures. By way of example, the NO2 conversion is 10% at about 220° C., whereas the NO2 conversion is 50% at about 320° C. and 90% at about 430° C.

For instance, if an oxidation catalytic converter is arranged upstream of a particulate filter which not only oxidizes NO contained in the exhaust gas to NO2 which subsequently can be used for burning soot in the particulate filter but can also generate heat by burning hydrocarbon which is injected into the exhaust gas stream.

If the exhaust temperature is too low to have an efficient NO2-based regeneration of the particulate filter, injection of hydrocarbon, i.e. fuel, is expedient for increasing the temperature. The hydrocarbon can be burned on an oxidation catalyst upstream of the particulate filter and increase the temperature of the exhaust gas discharged from the oxidation catalyst. When the oxidation catalyst is oxidizing hydrocarbons it cannot convert NO to NO2 at the same time. This leads to no or low soot regeneration. In order to avoid "poisoning" of the oxidation catalyst by hydrocarbon short injection pulses of hydrocarbon can be used.

The invention claimed is:

1. An operating method of an exhaust gas aftertreatment system comprising at least a particulate filter for retaining soot from exhaust gas of an engine and a deNOx catalytic converter for reducing nitrogen oxide in the exhaust gas of the engine, the particulate filter being provided upstream of the deNOx catalytic converter, comprising
performing an active regeneration of the particulate filter, the active regeneration comprising
detecting that a temperature of the exhaust gas produced by the engine is below a predetermined minimum temperature,
running the engine in a heat mode with increased output of nitrogen oxide and a higher exhaust gas temperature until the exhaust gas temperature exceeds the predetermined minimum temperature,
synchronizing operation regimes of the particulate filter and of the deNOx catalytic converter with respect to each other for performing regeneration of the particulate filter, and
providing an amount of nitrogen dioxide for the regeneration of the particulate filter while the catalytic converter provides a nitrogen oxide conversion efficiency above a predetermined limit.

2. The method according to claim 1, wherein the operation regimes of the particulate filter and of the deNOx catalytic converter are synchronized by at least one of
operation temperature of the particulate filter and the deNOx catalytic converter;
exhaust gas composition;
timing of an intermittent regeneration of the particulate filter and high nitrogen conversion in the deNOx catalytic converter.

3. The method system according to claim 1, wherein a dosing of a reductant upstream of the deNOx catalytic converter is modified such that a nitrogen oxide emission is kept constant or modified within determined boundaries.

4. The method according to claim 1, wherein an operation temperature of the exhaust gas downstream of the particulate filter and upstream of the deNOx catalytic converter is limited to an upper temperature tolerable for the catalytic converter.

5. The method according to claim 1, wherein an operation temperature of the exhaust gas downstream of the particulate filter and upstream of a catalytic converter is limited to an upper temperature tolerable for the additional catalytic converter.

6. The method according to claim 1, wherein the operation regime of at least one of the particulate filter and the catalytic converter are compensated for an aging effect of one or more components of the exhaust gas aftertreatment system.

7. The method according to claim 1, wherein the operation regimes of the particulate filter and the deNOx catalytic converter are synchronized continuously at least during operation of the engine.

8. The method according to claim 1, wherein the operation regimes of the particulate filter and the deNOx catalytic converter are synchronized on a periodic basis at least during operation of the engine.

9. An engine including an exhaust gas aftertreatment system, comprising
the engine,
at least a particulate filter for retaining soot from exhaust gas of an engine,
a deNOx catalytic converter for reducing nitrogen oxide in the exhaust gas of the engine, the particulate filter being provided upstream of the deNOx catalytic converter, and
a control unit configured to perform an active regeneration of the particulate filter, the active regeneration comprising detecting that temperature of the exhaust gases produced by the engine is below a predetermined minimum temperature, running the engine in a heat mode with increased output of nitrogen dioxide and a higher exhaust gas temperature until the exhaust gas temperature exceeds the predetermined minimum temperature, synchronizing operation regimes of the particulate filter and of the deNOx catalytic converter with respect to each other for increasing an amount of nitrogen oxide for at least one of oxidizing soot in the particulate filter, and running the engine in so that the catalytic converter provides a nitrogen oxide conversion efficiency above a predetermined limit.

10. The engine and system according to claim 9, wherein the deNOx catalytic converter is a selective reduction catalytic converter.

11. The engine and system according to claim 9, wherein an oxidation catalyst is arranged between the particulate filter and the deNOx catalytic converter.

12. The engine and system according to claim 9, wherein a clean-up catalyst is arranged downstream of the particulate filter, deNOx catalytic converter and an oxidation catalytic converter.

13. The method according to claim 1, wherein output of nitrogen oxide from the engine is increased during an intermittent regeneration of the particulate filter while the catalytic converter provides a nitrogen oxide conversion efficiency above the predetermined limit.

* * * * *